Aug. 3, 1965    A. R. HILEY    3,198,224
STUMP CUTTING APPARATUS
Filed Sept. 27, 1961    4 Sheets-Sheet 1
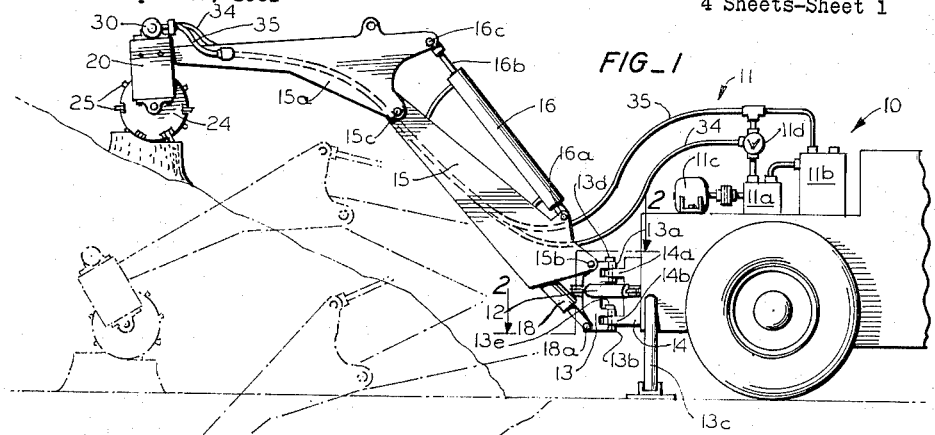
FIG_1
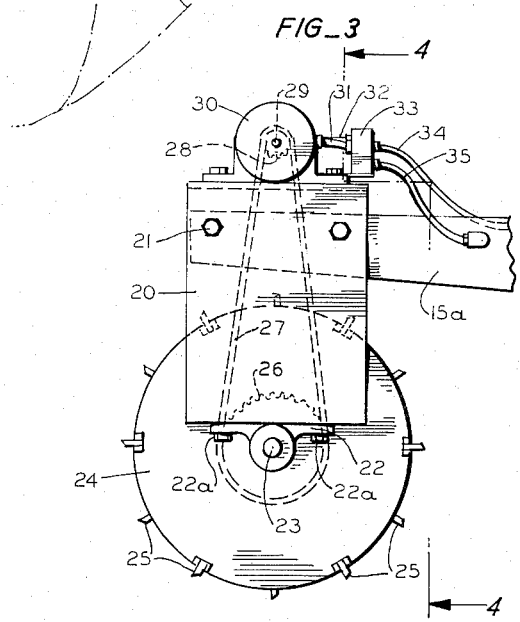
FIG_3
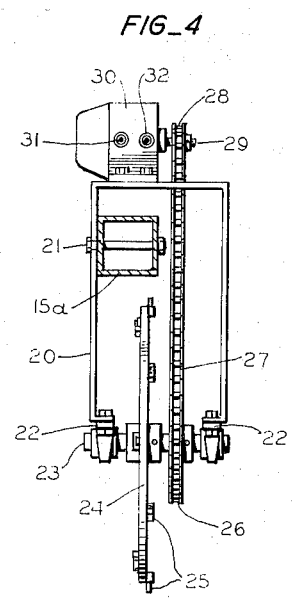
FIG_4
INVENTOR.
ALAN R. HILEY
BY
*Allen and Chromy*
ATTORNEYS

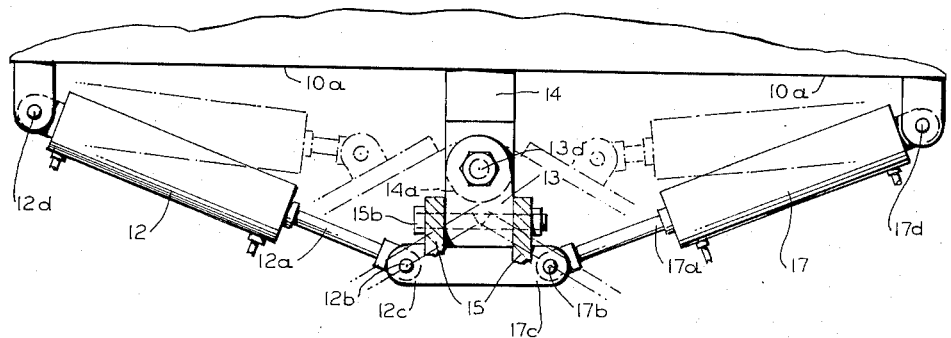
FIG_2
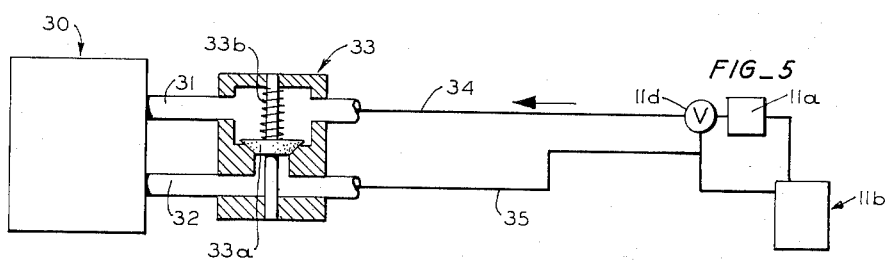
FIG_5
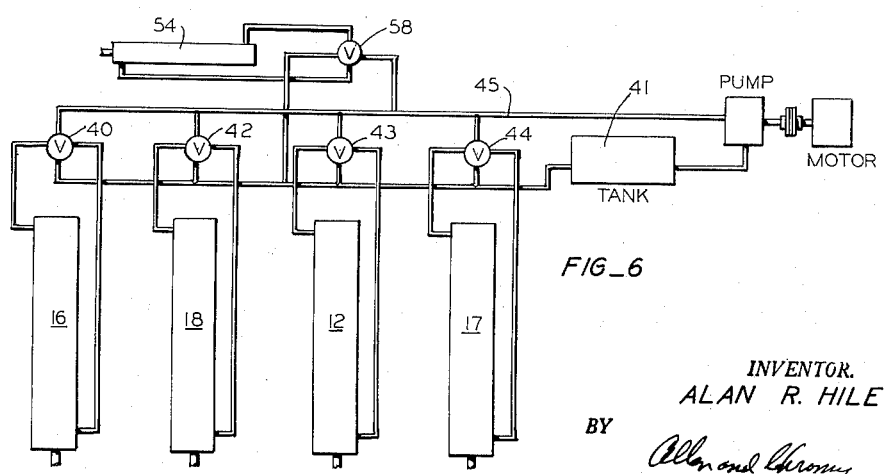
FIG_6
INVENTOR.
ALAN R. HILEY
BY
ATTORNEYS

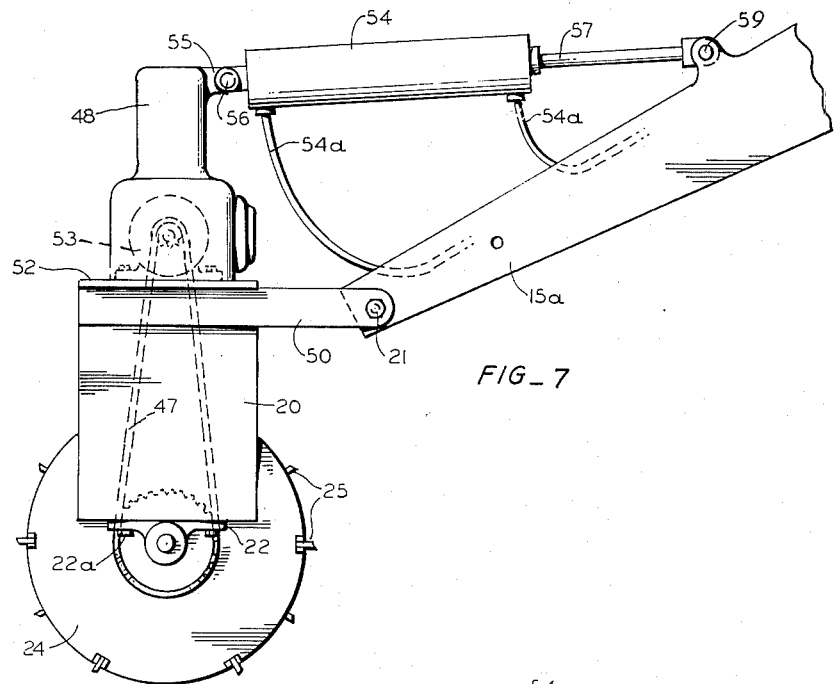
FIG_7
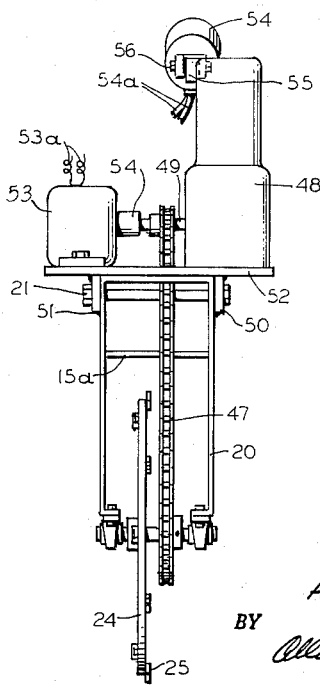
FIG_8
INVENTOR.
ALAN R. HILEY
BY Allen and Chromy
ATTORNEYS Aug. 3, 1965  A. R. HILEY  3,198,224
STUMP CUTTING APPARATUS
Filed Sept. 27, 1961  4 Sheets-Sheet 4
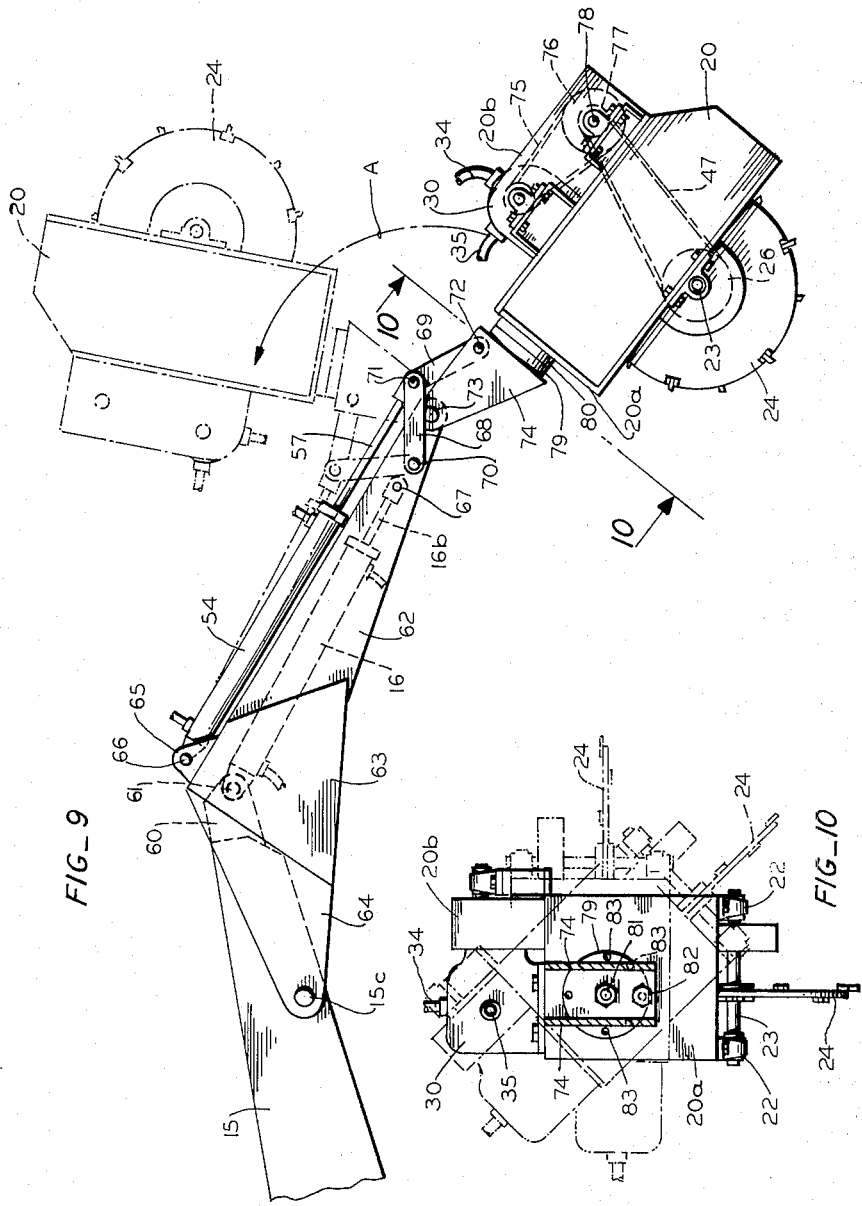
INVENTOR.
ALAN R. HILEY
BY
Allen and Chromy
ATTORNEYS

United States Patent Office 3,198,224
Patented Aug. 3, 1965

3,198,224
STUMP CUTTING APPARATUS
Alan R. Hiley, P.O. Box 477, Felton, Calif.
Filed Sept. 27, 1961, Ser. No. 141,944
8 Claims. (Cl. 144—2)

This application is a continuation in part of my application Serial No. 101,874, filed April 10, 1961, and now abandoned.

This invention relates to a portable stump cutting apparatus in general. More particularly, this invention relates to an improved stump cutting apparatus which may be easily adjusted for use in cutting stumps both on inclined ground as well as on level ground.

An object of this invention is to provide an improved portable stump cutting machine.

Still another object of this invention is to provide an improved portable stump cutting machine that is highly flexible and may be positioned either on a hillside or on level ground.

Still another object of this invention is to provide an improved stump cutting apparatus in which the stump cutting element is positioned on the free end of a collapsible or foldable boom which is attached to and operated from a machine such as a tractor, said boom being adapted to be extended or contracted so that the cutting element may be located and operated at different distances and at different elevations with respect to the tractor.

Still another object of this invention is to provide an improved stump cutting apparatus with a hydraulically driven cutting element assembled on a box-like frame which is adapted to be pivotally and rotatably attached to the working end of a collapsible or foldable boom that is rotatably attached to the rear end of a machine such as a tractor, and is adapted to be controlled therefrom so that the boom may either raise or lower the cutting element or swing it around with respect to the rear end of the tractor, whereby stumps in different locations with respect to the tractor rear may be easily reached for cutting.

Other and further objects of this invention will be apparent to those skilled in the art to which it relates from the following specification, claims and drawings in which, briefly:

FIG. 1 is a side view of this apparatus showing it attached to the rear end of a tractor and also showing in broken lines the different elevational positions at which the cutting element may be readily employed;

FIG. 2 is a plan view of the apparatus shown in FIG. 1 illustrating different locations of the stumps at the rear of a tractor that are readily accessible to this cutting apparatus;

FIG. 3 is a detail view of the stump cutting element and hydraulic drive therefor as arranged on a frame which is adapted to be mounted on the free end of the tractor boom;

FIG. 4 is a front view of the apparatus shown in FIG. 3;

FIG. 5 is a schematic diagram showing the hydraulic connections and controls employed for driving the stump cutting element;

FIG. 6 is a schematic diagram of hydraulic connections and controls employed for positioning the cutting element supporting boom during the stump cutting operation;

FIG. 7 is a fragmentary side view of a modified form of this invention;

FIG. 8 is a front view of the apparatus shown in FIG. 7;

FIG. 9 is a partial side view of another embodiment of this invention; and

FIG. 10 is a sectional view taken along the line 10—10 of FIG. 9.

Referring to the drawing in detail, this apparatus is shown attached to the rear end of a conventional tractor 10, the rear part of which is illustrated in the drawing. The cutting element mounting and positioning apparatus includes a member 13 which is pivotally mounted on the rear of the tractor. The member 13 is provided with a pair of upper projections 13a and a pair of lower projections 13b which are pivotally attached to the members 14a and 14b, respectively, extending from the rear frame member 14 of the tractor. A pivot pin 13d extends through suitable holes formed in the members 13a and 14a and pivot pin 13e extends through suitable holes formed in the members 13b and 14b. Thus these pins 13d and 13e form pivots whereby the boom of this apparatus may be moved horizontally through an angle of about 80 degrees with respect to the rear end of the tractor.

The boom employed in accordance with this invention is made up of two members 15 and 15a which are pivotally connected together by means of the pivot pin 15c so that the forward free end of the boom member 15a may be moved up and down with respect to the rear member 15. The rear boom member is pivotally attached to the member 13 by means of the pivot pin 15b and a hydraulic cylinder 18 is employed to swing the boom up and down on the pivot pin 15b. Another hydraulic cylinder 16 is provided for swinging the boom member 15a on the pivot pin 15c with respect to the boom member 15. Hydraulic cylinder 16 is pivotally attached by means of the pivot pin 16a to the boom member 15. It is also provided with a piston (not shown) and a piston rod 16b which is pivotally attached to the forward boom member 15a by means of the pivot pin 16c.

Both ends of the cylinder 16 are connected by means of suitable hoses and valve 40, as shown diagrammatically in FIG. 6, to a fluid pressure tank 41 so that fluid pressure may be supplied to either end of this cylinder by manipulating valve 40 and the forward boom member 15a may be moved up and down, that is, it may be tilted with respect to the rear boom member 15 around the pivot 15c. The rear boom member 15 may be moved up and down around the pivot 15b by means of the hydraulic cylinder 18 which is pivotally attached to the member 13 by means of the pivot pin 18a. This cylinder 18 is also provided with a piston and a piston rod (not shown) which is pivotally connected to the pivot pin 15c. Fluid pressure may be supplied to either end of this cylinder selectively by manipulating the valve 42 (shown in FIG. 6) so that the rear boom member 15 may be moved up and down as desired.

Thus the cutting element 24 which is supported on the forward end of the boom may be elevated to different positions by controlling the fluid pressure to the cylinders 16 and 18 so that this cutting element may be employed for cutting stumps positioned at different elevations with respect to the rear of the tractor. The valves 40 and 42, or either one of them, also may be set to provide a certain fluid pressure in one or both of the cylinders 16 and 18 during the stump cutting operation so that a certain pressure is applied to the cutting element 24 for urging this cutting element into the stump and also for gradually traversing the cutting element over the stump during the cutting operation.

The rotatable cutting element 24 is supported on the free end of the boom member 15a by the substantially U-shaped frame 20 which is attached to this boom member by the bolts 21 as shown in FIGS. 3 and 4. The rotatable cutting element 24 is fixedly attached to a shaft 23 which is journaled in bearings 22 that are attached to the ends of the U-shaped member 20 by the bolts 22a. Suitable teeth 25 are mounted at spaced intervals around the periphery of the cutting element 24. A sprocket wheel or pulley 26 is fixedly attached to the shaft 23 of the cutting element and a drive chain or belt 27 is provided between this sprocket wheel and the sprocket wheel 28. The latter sprocket wheel is fixedly attached to the shaft 29 of the hydraulic motor 30 which is attached to the top of the frame 20. This hydraulic motor is provided with hose connections 31 and 32 which extend to the check valve 33, shown diagrammatically in FIG. 5. Additional hose connections 34 and 35 are provided from this check valve and these are supported by the boom and extend to the control valve 11d and tank 11b on the rear of the tractor 10. The pump 11a is driven by a suitable power takeoff on the tractor engine or by the motor 11c to circulate fluid under pressure to the motor 30 through line 34, shown in FIG. 1. This fluid is returned from motor 30 through return line 35 to the bottom of tank 11b. A pressure relief valve 11d is connected in the line 35 and it is provided with a by-pass extending between the pump 11a and the tank 11b, as shown in FIG. 5, so that fluid under pressure may circulate through this by-pass to different extents, depending on how much fluid pressure is supplied to the hydraulic motor 30. In other words, if the cutting element 24 is cutting under full load, the valve 11d is fully open to line 34 so that sufficient fluid pressure is supplied to the hydraulic motor to drive the cutting element and very little or no fluid pressure is by-passed to the tank 11b. However, if the cutting element 24 is overloaded, in order to prevent overload of the system or breakage, the pressure relief valve 11d functions to relieve pressure from line 34 by opening to the by-pass line.

The boom of this apparatus also may be rotated horizontally around the rear end of the tractor, as shown in FIG. 2, by means of the hydraulic cylinders 12 and 17 which are provided with piston rods 12a and 17a, respectively, that are attached to the lugs 12c and 17c, respectively, by means of the pivot pins 12b and 17b, respectively. These cylinders 12 and 17 are provided with supporting members that are pivotally attached to the member 10a by means of the pivot pins 12d and 17d. Both of the cylinders 12 and 17 may be supplied with fluid pressure at opposite ends thereof at the same time by adjusting the valves 43 and 44, respectively, so that one of these cylinders will in effect be pushing and the other will be pulling while the boom is swung around the rear of the tractor to the desired position, or while the cutting element 24 is being traversed over a stump during the cutting operation. These cylinders 12 and 17 as well as the cylinders 16 and 18 may be operated by fluid under pressure from the same source as shown schematically in FIG. 6, to which they are connected by means of the pipe 45 and valves 43, 44, 40, and 42, respectively. Each of these valves is adapted to supply fluid under pressure to either end of the cylinder to which it is connected by suitable piping or hoses.

The cutting element 24, check valve 33, and hydraulic motor 30 are assembled on a separate U-shaped frame 20 which is attached to the free end of the boom member 15a by the bolts 21, as shown in FIGS. 3 and 4. Suitable connections are also provided in the lines 34 and 35 so that when the frame 20 is to be removed from the free end of the boom member 15a, this may be simply and efficiently done by opening these connections and removing the bolts 21. Thus other devices may be mounted on the free end of the boom for use with the tractor which may thus be used in performing other jobs.

The operation of this apparatus is as follows: The cutting element 24 is located with respect to the stump that is to be removed by shredding or cutting. This is done by backing up the tractor so that the stump is within reach of the cutting element and then the legs 13c, which are conventional, are lowered and firmly set on the ground. It is of course not necessary that the tractor be precisely located with respect to a certain stump, inasmuch as this apparatus has considerable flexibility in that the cutting element may be moved through extension of the boom or contraction thereof by supplying fluid pressure to either the rear or forward end of the cylinder 16 through manipulation of the valve 40. Furthermore, the boom may be raised by supplying fluid pressure to the cylinder 18 through valve 42 so that a stump located on an incline may be reached by the cutting element. On the other hand, a stump located below the level of the tractor may also be reached by the cutting element by lowering the boom also through the operation of the hydraulic cylinder 18. Furthermore, stumps located quite close to the rear of the tractor may be reached by the cutting element by folding the boom through the operation of the cylinder 16. On the other hand, the boom may also be swung around the rear of the tractor by supplying fluid pressure to cylinders 12 and 17 so that different stumps located around the rear of the tractor may be reached by the cutting element. Also, after one stump is cut up, then the boom may be swung so that the cutting element is in position to cut up another adjacent stump and so on until the whole area around the rear of the tractor is cleared, without moving the tractor.

After the cutting element 24 is positioned with respect to the stump that is to be cut up so that the apparatus is ready to start the cutting operation, the pump 11a is driven by the motor 11c, shown in FIG. 1, or it is driven by connecting it by a suitable clutch to the rear power take-off of the tractor and fluid under pressure is supplied to line 34, through pressure relief valve 11d, check valve 33 and connection 31 to the hydraulic motor 30. Thus fluid under pressure passes through line 34 into check valve 33 and through line 31 to the hydraulic motor 30 and return fluid passes from the hydraulic motor 30 through line 32, and line 35 to the tank 11b. The fluid under pressure operates the hydraulic motor 30 which transmits power through the belt 27 to the cutting element 24. This element is driven at a speed of about 700 r.p.m. so that the cutting teeth 25 thereof function to cut up the stump. As the stump is cut up, the cutting element 24 is traversed thereover, that is, this cutting element is fed into the stump continuously. This is done by supplying a certain amount of fluid pressure to each of selected cylinders 16, 18, 12 and 17 of the apparatus so that the boom exerts the desired pressure on the cutting element, forcing it into the stump. This pressure is just sufficient to urge the cutting element 24 into the stump and gradually move the boom in this direction as the stump is cut up. The valves supplying fluid pressure to these cylinders 16, 18, 12 and 17, namely valves 40, 42, 43 and 44, respectively, are of course controlled by the operator so that more or less pressure is supplied to these cylinders and so that the cutting element is traversed over the stump as rapidly as desired, depending upon the hardness of the wood and the size of the stump. After the stump is cut up, the tractor clutch is disengaged from the pump 11a or if the pump is driven by the motor 11c, said motor is stopped and fluid pressure is cut off to the hydraulic motor. When fluid pressure is cut off from the hydraulic motor 30, the momentum of the cutting element 24 being substantial, causes this cutting element to keep on rotating for a period of time. Thus this cutting element actually drives the hydraulic motor 30 until the energy stored in this momentum is expended. Rotation of the motor produces suction on the top of valve element 33a and this suction, together with fluid pressure under the valve element 33a raises this element against the spring 33b. Thus during this time, fluid is circulated through the connection 32, valve 33 and connection 31 through the hydraulic motor 30 until the momentum of the cutting element 24 is expended, that is, until this cutting element stops rotating.

A modified form of this invention is shown in FIGS. 7 and 8 in which the internal combustion engine 48 of conventional construction, which has an output power shaft 49, is employed for driving the cutting element 24. Elongated frame members 50 and 51 are attached by welding or the like to the upper portion of the U-shaped frame member 20, and these elongated frame members 50 and 51 extend to the free end of the boom member 15a to which they are pivotally attached by means of the bolt 21. A plate 52 which forms the support for the internal combustion engine 48 and the starting motor 53, is attached to the top of the frame 20 and to the forward portions of the elongated members 50 and 51 by welding or the like, and the engine 48 and starting motor 53 are attached to this plate by suitable bolts. The motor 53 may be attached to the side of the engine 48 if desired. The shaft 49 of the engine 48 is provided with a suitable pulley or sprocket wheel for engaging a belt or chain 47 which extends to the pulley or sprocket wheel fixedly mounted on the cutting element shaft and thus power is transmitted to the cutting element by the engine 48.

The motor 53 which is employed for starting the internal combustion engine 48 is provided with a conventional starting drive or clutch 54 that is adapted to engage the shaft 49 of the engine when this motor is turned on by supplying electric current thereto through the wires 53a whereby the motor 53 functions to start the engine 48, and as soon as the latter is started, the clutch 54 is automatically disengaged from the shaft 49 of the engine.

The cutting element and internal combustion engine drive, shown in FIGS. 7 and 8, is adapted to be tilted with respect to the end of the boom 15a. This is accomplished by providing a hydraulic cylinder 54 which is connected between the top of the engine 48 and the boom member 15a. One end of the cylinder 54 is provided with an extension that is pivotally connected by means of the bolt 56 to the member 55 which is attached to the top of the engine housing by welding or the like. The cylinder 54 is provided with a piston rod 57 and the free end of this piston rod is connected by means of the bolt 59 to the boom member 15a. Thus by supplying fluid pressure to the cylinder 54 through one of the hose connections 54a, the engine 48 and the cutting element 24 may be tilted with respect to the pivot 21 and boom member 15a around this pivot. With this arrangement, the cutting element 24 may be rotated with respect to the end of the boom and placed in various desired positions with respect to the end of the boom and also with respect to the stump that is to be cut up. Thus if the stumps to be cut up are positioned on a hillside, the cutting element may be adjusted to a certain position with respect to the end of the boom whereas if the stumps are located on level terrain other positions may be assumed by the cutting element.

The starting switch for the starting motor 53 is positioned on the rear of the tractor conveniently accessible to the operator of this apparatus and this motor is connected to such a starting switch and to a suitable battery also positioned on the rear of the tractor by means of the wires 53a. The internal combustion engine 48 is of conventional construction and may be of about 30 horsepower depending upon the size of the cutting element 24. This engine is also provided with a governor of conventional construction so that it will not operate at excessive speed while idling and on the other hand will tend to maintain its speed under load.

Cylinder 54 is connected by means of the hoses 54a to a suitable source of fluid pressure as shown in FIG. 6 and a valve 58 is provided to these hose connections so that fluid pressure may be applied either to the left-hand end of this cylinder or to the right-hand end as desired for moving the apparatus around pivot bolt 21.

The stump cutting apparatus shown in FIGS. 3 and 4 may also be pivotally attached to the end of the boom in the manner shown in FIGS. 7 and 8 instead of being fixedly bolted thereto. For this purpose, elongated frame members such as members 50 and 51 may also be provided to the U-shaped frame 20 shown in FIGS. 3 and 4 and the hydraulic cylinder such as cylinder 54 may be pivotally attached to the top of the hydraulic motor in the same manner as this cylinder is attached to the top of the engine 48.

The stump-cutting apparatus shown in FIGS. 3, 4, 7 and 8 may also be attached to the end of the boom in the manner shown in FIGS. 9 and 10 so that the cutting wheel 24 may be not only tilted up and down as shown in the solid and broken outline in FIG. 9, but it may also be angularly tilted around the bolt 81 as an axis as shown in the solid line and broken line illustration in FIG. 10. The boom arrangement provided to the apparatus shown in FIGS. 9 and 10 differs in certain respects, which will now be described, from the boom arrangements shown in FIGS. 1 and 7.

The basic boom member 15 provided to the apparatus shown in FIG. 9 is similar to the basic boom member 15 shown in FIG. 1 and is mounted on the rear end of the tractor in the same manner so that it may be tilted up and down by the use of a cylinder such as the cylinder 18, and it also may be swung sidewise or horizontally through the operation of cylinders such as cylinders 12 and 17 shown in FIG. 2. The cylinder 16 which is used to retract or extend the outer boom member 62 is located at the forward end of boom member 15 in the apparatus shown in FIG. 9 instead of being mounted over the boom member as shown in FIG. 1.

The forward end of boom member 15 is provided with an extension 60 to which the cylinder 16 is pivotally attached by means of the pivot 61 so that this pivot is positioned ahead of pivot 15c which pivotally supports boom member 62. The piston rod 16b of this cylinder is pivotally attached by means of the pivot 67 to the forward end portion of the boom member 62. The boom member 62 is provided with slightly offset plate sections 63 and 64 which are parallel and joined together and form the rear part of this boom member. Thus the boom 62 is formed of a number of substantially parallel plates which are joined together and the rearmost ones 64 of which are positioned on the opposite sides of the forward end of boom member 15 to which these plates 64 are pivotally attached by means of the pivot 15c.

A projecting plate member 65 is attached to the upper part of plate member 63 and the cylinder 54 is pivotally attached to this plate member by means of the pivot 66. The outer end of piston rod 57 of cylinder 54 is pivotally attached to the pivot pin 71 of the linkage comprising the links 68 and 69. The bottom part of link 68 is pivotally attached by the pivot pin 70 to the boom member 62 and the bottom part of link 69 is pivotally attached by the pivot pin to the plate members 74 which are pivotally attached to the forward end portion of boom member 62. Thus, when the valve 58 shown in FIG. 6 is operated to supply fluid pressure to the forward end of the cylinder 54 so that the piston rod 57 is drawn into the cylinder, the linkage 68–69 is tilted backward on its pivot 70 and at the same time this linkage is folded so that the stump cutting apparatus is tilted backward on its pivot 73 in the direction indicated by the curved and broken arrow line A to its extreme upper position with respect to the boom member 62 as shown in broken outline in FIG. 9. The stump cutting apparatus may be positioned in any position between those shown in FIG. 9 by the operating cylinder 54 and rod 57 and the position selected will of course depend upon the location of the stump.

This stump cutting apparatus is also adapted to be turned on the axis of the pivot bolt 81 which extends through the plates 79 and 80 and supports the apparatus on the forward end of the boom structure. The plate 79 is attached by welding or the like to the front edges of the plates 74 and plate 80 is attached in a similar fashion to the plate 20a which forms the back part of the frame 20 of the stump cutting apparatus. Holes 83 which are adapted to be aligned are provided in the plate members 79 and 80 for receiving the bolt 82 so that the stump-cutting apparatus may be held in the desired angular position with respect to the end of the boom. Thus the holes 83 in plate member 80 may be spaced 45 degrees apart so that the cutting element 24 of the apparatus may be positioned in different angular positions separated by 45 degrees and including horizontal positions extending either to the left or the right. The bolt 82 may be threaded into the holes formed in the plate member 80 so that it may be firmly fastened therein to maintain these angular adjustments. Also a pair of bolts such as the bolt 82 may be employed if desired, one in the upper set of holes and the other in the lower holes.

The hydraulic motor 30 shown in FIG. 9 is similar to the hydraulic motor 30 shown in FIGS. 3 and 4. Where desired a suitable speed-reducing arrangement may be interposed between the driving sprocket of the motor 30 and the sprocket 26 of the cutting wheel, and this speed-reducing arrangement may include a large sprocket 76 which is driven by means of a chain or belt 75 from the sprocket of the motor 30. This large sprocket is keyed to the shaft 78 as is also the small sprocket 77 and a belt or chain 47 is provided between the small sprocket 77 and the larger sprocket 26 of the cutting element 24. Suitable bearings are provided to the shaft 78 and these are attached to the frame 20. Also a suitable housing 20b is provided for enclosing the belt or chain 75 and the sprockets associated therewith.

Cylinder 54 may be employed for controlling or moving other devices such as a back hoe which may be attached to the end of the boom member 15a by bolts similar to the bolts 21, if desired, and in such case this apparatus comprising the cutting element 24 and its driving mechanism will, of course, be removed from the end of the boom member 15a as well as detached from the cylinder 54. This apparatus, namely the cutting element 24, frame 20 and driving motor 30 or engine 48 may be removed as a unit from the boom 15 and it may be mounted on a similar boom of any standard back hoe provided with the various controls described herein.

While I have shown a preferred embodiment of the invention, it will be understood that the invention is capable of variation and modification from the form shown so that its scope should be limited only by the scope of the claims appended hereto.

What I claim is:

1. In stump cutting apparatus adapted to be attached to the free end of a pivoted and foldable boom which is attached to the rear of a tractor, the improvement comprising a rigid frame, a rotatable stump cutting element, a shaft for said cutting element, bearing means for said shaft attached to said frame for supporting said cutting element so that it extends downward from said frame, a hydraulic motor attached to said frame, means for coupling said hydraulic motor to said cutting element for driving said cutting element, a source of fluid pressure positioned on said tractor, means including a fluid pressure line and a return fluid line supported on said boom for supplying fluid pressure from said source to said hydraulic motor for driving said motor, a directional valve connected to said motor for by-passing fluid pressure around said motor when said motor is coasting by virtue of the momentum of said cutting element, said directional valve being connected so that it is responsive to suction produced by said motor during said coasting, and means for attaching said frame to the free end of said boom so that said cutting element extends downward from said free end of said boom.

2. In stump cutting apparatus adapted to be attached by means of a pivoted and foldable boom to the rear of a tractor, the improvement comprising a rigid frame having a pair of depending members, a rotatable stump cutting element, a shaft for said cutting element, bearing means for said shaft attached to said depending members for supporting said cutting element between said depending members so that said cutting element extends downward from said frame, a hydraulic motor attached to said frame, means for coupling said motor to said cutting element for driving said cutting element, a source of fluid pressure positioned on said tractor, means including a fluid pressure line and a return fluid line supported on said boom for supplying fluid pressure from said source to said hydraulic motor for driving said motor, a directional valve connected to said motor for by-passing fluid pressure around said motor when said motor is coasting by virtue of the momentum of said cutting element, so that said directional valve is responsive to suction produced by said motor during said coasting, said frame including a member connected to said depending members, said attaching means including means pivotally attaching said last mentioned member of said frame to the free end of said boom so that said cutting element may be adjusted angularly with respect to said free end of said boom whereby said cutting element is adapted to be lowered onto the stump to be cut up even though the stump is on an incline to the stump cutting apparatus.

3. In stump cutting apparatus adapted to be attached by means of a pivoted and foldable boom to be the rear of a tractor the improvement comprising a frame having a pair of depending members, a rotatable stump cutting element, a shaft for said cutting element, bearing means for said shaft attached to said depending members for supporting said cutting element between said depending members so that said cutting element extends downward from said frame, a hydraulic motor attached to said frame, means for coupling said motor to said cutting element for driving said cutting element, a source of fluid pressure positioned on said tractor, means including a fluid pressure line and a return fluid line supported on said boom for supplying fluid pressure from said source to said hydraulic motor for driving said motor, a directional valve connected to said motor for by-passing fluid pressure around said motor when said motor is coasting by virtue of the momentum of said cutting element, said directional valve being connected so that it is responsive to suction produced by said motor during said coasting, means for pivotally attaching said frame to the free end of said boom, remote control means for moving said frame on said pivotal mounting means so that said cutting element extends either forward, upward or downward from said free end of said boom and means on said tractor for controlling said last mentioned means.

4. In stump cutting apparatus as set forth in claim 3 further comprising means for tilting said frame and said cutting element sidewise with respect to the end of said boom, said last mentioned means including means for fixing said frame and said cutting element in predetermined tilted positions including substantially vertical and substantially horizontal positions.

5. In stump cutting apparatus as set forth in claim 3 further characterized in that said means for pivotally attaching said frame to said boom includes a member that is pivotally attached to said frame to permit said frame to be rotated around the end of said boom substantially at right angles to the axis of said pivoting means whereby said frame and said cutting element may be tilted from substantially vertical to substantially horizontal and intermediate positions.

6. In stump cutting apparatus as set forth in claim 1 further characterized in that said rigid frame comprises a pair of spaced members depending from a top member rigidly attached thereto and a back member rigidly attached to said top member and to said spaced members, said attaching means being attached to said back member and said rotatable cutting element is positioned between said spaced members.

7. In stump cutting apparatus as set forth in claim 6 further characterized in that said cutting element is substantially circular with coarse teeth around the pheriphery thereof, said cutting element also having a narrow width so that when it is lowered by said boom onto the stump to be cut up its coarse teeth dig into and cut up the part of the stump that is above ground as well as the part that is below ground.

8. In stump cutting apparatus as set forth in claim 6 further characterized in that said hydraulic motor is attached to the top member of said frame and the means for coupling the hydraulic motor to said cutting element extends downward from said motor between said spaced members and around said shaft.

References Cited by the Examiner
UNITED STATES PATENTS

| | | |
|---|---|---|
| 2,733,738 | 2/56 | Block. |
| 2,746,492 | 5/56 | De Hardit. |
| 2,815,048 | 12/57 | Davis. |
| 2,912,022 | 11/59 | Ver Ploeg et al. |
| 2,927,613 | 3/60 | Franzer et al. |
| 3,032,956 | 5/62 | Mullet. |
| 3,044,509 | 7/62 | Kehler. |

WILLIAM W. DYER, JR., *Primary Examiner.*

WALTER A. SCHEEL, DONALD R. SCHRAN, ANDREW R. JUHASZ, *Examiners.*